J. E. CONZELMAN.
CONCRETE CONSTRUCTION.
APPLICATION FILED NOV. 16, 1909.

1,008,587.

Patented Nov. 14, 1911.

Witnesses:
Chas. A. Baker,
George G. Anderson.

Inventor:
John E. Conzelman,
By Hugh N. Wagner
His Attorney.

J. E. CONZELMAN.
CONCRETE CONSTRUCTION.
APPLICATION FILED NOV. 16, 1909.

1,008,587.

Patented Nov. 14, 1911.

Witnesses:
Chas. A. Becker,
George G. Anderson.

Inventor:
John E. Conzelman,
By Hug. N. Wagner,
His Attorneys.

J. E. CONZELMAN.
CONCRETE CONSTRUCTION.
APPLICATION FILED NOV. 16, 1909.

1,008,587.

Patented Nov. 14, 1911.
8 SHEETS—SHEET 4.

Witnesses:
Chas. A. Becker,
George G. Anderson

Inventor:
John E. Conzelman,
By Hugh K. Wagner,
His Attorney

J. E. CONZELMAN.
CONCRETE CONSTRUCTION.
APPLICATION FILED NOV. 16, 1909.

1,008,587.

Patented Nov. 14, 1911.

Witnesses:
Chas. A. Becker,
George G. Anderson.

Inventor:
John E. Conzelman,
By Hugh N. Wagner
His Attorney

J. E. CONZELMAN.
CONCRETE CONSTRUCTION.
APPLICATION FILED NOV. 16, 1909.

1,008,587.

Patented Nov. 14, 1911.

Witnesses:
Chas. A. Becker,
George G. Anderson

Inventor:
John E. Conzelman,
By Hugh N. Wagner
His Attorney.

J. E. CONZELMAN.
CONCRETE CONSTRUCTION.
APPLICATION FILED NOV. 16, 1909.

1,008,587.

Patented Nov. 14, 1911.
8 SHEETS—SHEET 7.

Witnesses:
Chas. A. Becker,
George G. Anderson.

Inventor:
John E. Conzelman,
By Hugh K. Wagner
His Attorney

J. E. CONZELMAN.
CONCRETE CONSTRUCTION.
APPLICATION FILED NOV. 16, 1909.

1,008,587.

Patented Nov. 14, 1911.
8 SHEETS—SHEET 8.

Witnesses:
Chas. A. Becker
George G. Anderson

Inventor:
John E. Conzelman,
By Hugh K. Wagner
His Attorney.

COLUMBIA PLANOGRAPH CO., WASHINGTON, D. C.

UNITED STATES PATENT OFFICE.

JOHN E. CONZELMAN, OF ST. LOUIS, MISSOURI, ASSIGNOR TO UNIT CONSTRUCTION COMPANY, OF WILMINGTON, DELAWARE, A CORPORATION OF DELAWARE.

CONCRETE CONSTRUCTION.

1,008,587. Specification of Letters Patent. Patented Nov. 14, 1911.

Application filed November 16, 1909. Serial No. 528,275.

*To all whom it may concern:*

Be it known that I, JOHN E. CONZELMAN, a citizen of the United States, residing at the city of St. Louis, State of Missouri, have invented certain new and useful Improvements in Concrete Construction, (Case H,) of which the following is a specification, reference being had therein to the accompanying drawings.

This invention relates to concrete building structures and refers particularly to a construction in which superimposed columns are joined to form a rigid and secure structure, and horizontal floor and ceiling members are used and are supported at the junction points of said columns; to a construction in which concrete slabs are used for ceilings and floors, and are supported at their corners or centers by uprights or columns; and, also, to a construction in which a concrete column is supported by a foundation.

It is the object of this invention to provide means for uniting concrete building elements to form a strong and durable structure, and, also, to provide the uniting means with reinforcement which greatly strengthens the juncture of said elements.

In the drawings forming part of this specification, in which like numerals of reference denote like parts wherever they occur.

It is to be understood that the slabs and columns hereinafter referred to may be made at any desired place, but preferably away from the location where the building in which they are used is being constructed.

For the purpose of illustration all-concrete columns are depicted in the drawings, but reinforced concrete columns or metal columns can be used, and said columns can, also, be of any size or shape.

Each slab 1 is molded with any desired configuration and can either be a flat slab or said slab can be provided with a flange 2 on the under side thereof. The corners 3 of each slab may rest on a shoulder 4 of the cap 5 of a column 6 and against stud 7 of such column, in the manner shown in Figs. 1, 2, 3, and 4. The stud 7 may be omitted and a corner 3 of each slab may be supported by a column 6, as shown in Figs. 7, 8, 9, 10, 13, and 14, or each slab 1 may be supported at or near its center by a column 6, as shown in Figs. 5, 6, 11, and 12.

Figure 1:
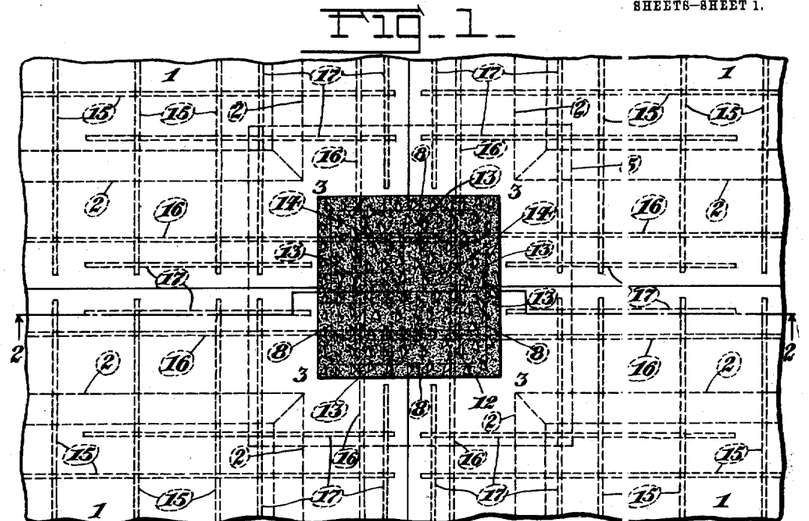
Figure 1 is a plan view.
Figure 2:
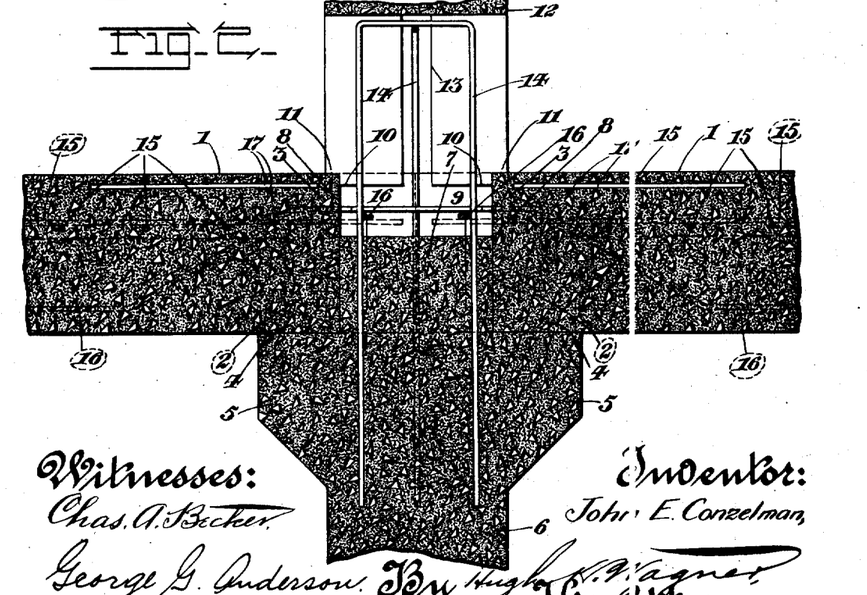
Fig. 2 is a sectional view on the line 2—2, Fig. 1.
Figure 3:
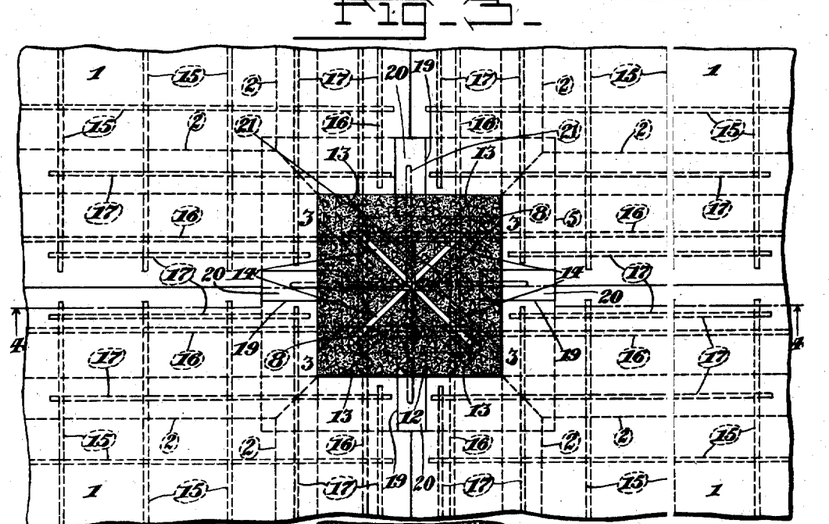
Fig. 3 is a plan view.
Figure 4:
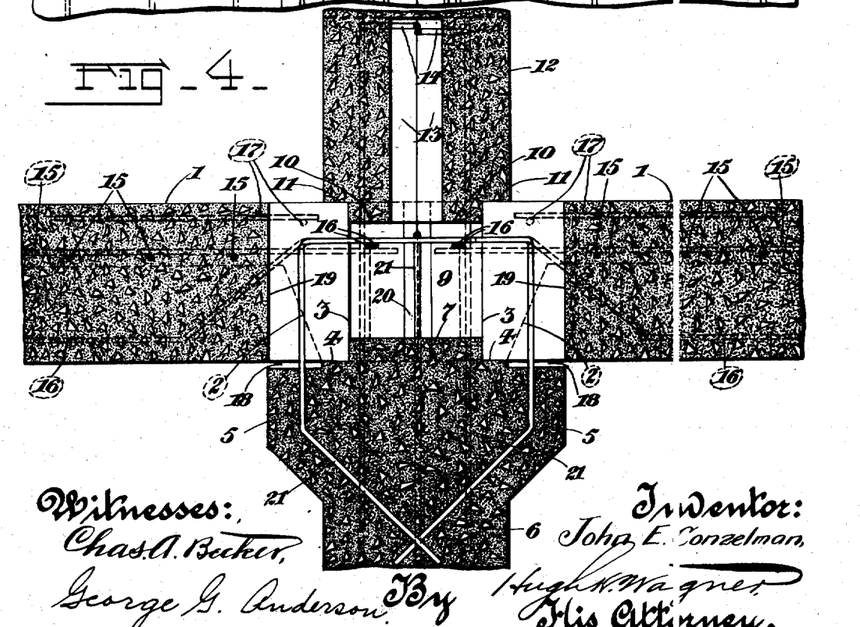
Fig. 4 is a sectional view on the line 4—4, Fig. 3.

In Figs. 1 and 2 the corner 3 of each slab 1 is provided with a recess 8, which is adapted to fit against stud 7 and to register with an adjacent recess 8. Said recesses form the sides of an open space 9 above the stud 7. The stud 10 and shoulder 11 are formed on column 12. Said shoulder 11 rests on said corners 3 and stud 10 projects into space 9. Said stud 10 preferably fits closely to the sides of said space 9, whereby the column 12 is prevented from any side motion. Said column 12 is provided with a slot 13 or a plurality of such slots which preferably intersect each other and which can either extend transversely through said column as shown in Figs. 1 and 2 or they can extend diagonally thereof as shown in Figs. 3 and 4.

Each rod 14 is bent into a U-shape and the ends thereof are set in the top of column 6. The bent portion of each rod 14 projects above column 6 and extends preferably across the bent portion of another rod 14. Said rods 14 occupy such positions relative to slots 13 that each rod 14 will enter one of said slots 13, when column 12 is placed in position over column 6.

Reinforcing rods or bars 15 are embedded in the lower part of each slab 1. Each flange 2 is reinforced with a rod or bar 16, which is embedded in the lower part of said flange, and, adjacent the end thereof turns upwardly into the upper part of said flange. Said rod or bar 16 may either protrude into space 9 in the manner shown in Figs. 1, 2, 3, and 4, or it may end adjacent the end of flange 2 and lie wholly within said flange. Short rods or bars 17 are embedded in the upper part of each slab and extend preferably over the column upon which each slab rests.

In uniting the elements hereinabove described into a concrete structure as shown in Figs. 1 and 2, the column 6 is set in position, then each slab 1 is placed so that a corner 3 rests on shoulder 4 and against stud 7, and column 12 is set in such position over column 6 that shoulder 11 rests on corners 3 and stud 10 enters space 9. Each slot 13 communicates with said space 9 and receives a rod 14. Each slot 13 is covered with a board (not shown in the drawings). Grout or wet concrete is then poured through an opening left over one of said boards and fills the space 9 and each slot 13. Said grout or wet concrete, being allowed to set in space 9 and in each slot 13, adheres to the sides thereof and, on account of the presence of the rods 14 in said slots, the union of the elements is greatly strengthened and a rigid and integral juncture is obtained.

In Figs. 3 and 4, the shoulder 4 of column 6 is provided with a cut-away portion 18. An indentation 19 is formed in each side of corner 3 and, when slabs 1 are in place each indentation registers with an adjacent indentation and forms therewith a slot 20. The rods 21 are bent preferably into the shape shown in Fig. 4 and each end thereof is set in the top of column 6. When slabs 1 are placed in position each corner 3 will rest on shoulder 4 and against stud 7, which in this form extends only a short distance above column 6, and each slot 20 is disposed opposite a similar slot 20. Each pair of oppositely-disposed slots 20 receives a rod 21. Rods 14 are set in column 6 and project in such manner above said column that each of said rods 14 will enter a slot 13. Said slots 13 preferably extend diagonally through column 12. A so-called form (not shown in the drawings) is placed at each corner of column 12 so that each slot 13 is covered. Each slot 20 is covered with a board and the sides of each cutaway portion 18 are, also, covered with a form to prevent the grout or wet concrete from running out of the same. An opening is left in one of said forms covering a slot 13 and grout or wet concrete is poured therethrough. Said grout or wet concrete runs into and fills each cut-away portion 18, each slot 20, space 9, and each slot 13 and is allowed to set therein, whereby the elements are united strongly together and form a rigid and integral structure.

Figure 5:
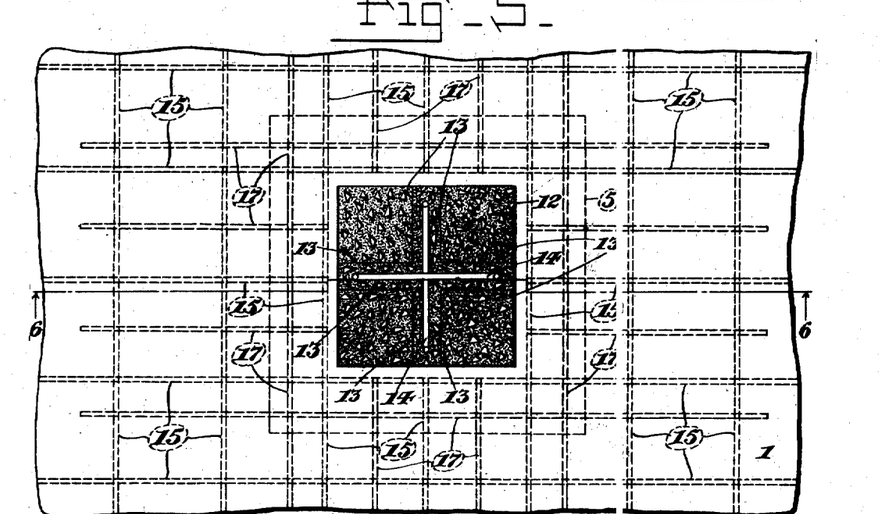
Fig. 5 is a plan view.
Figure 6:
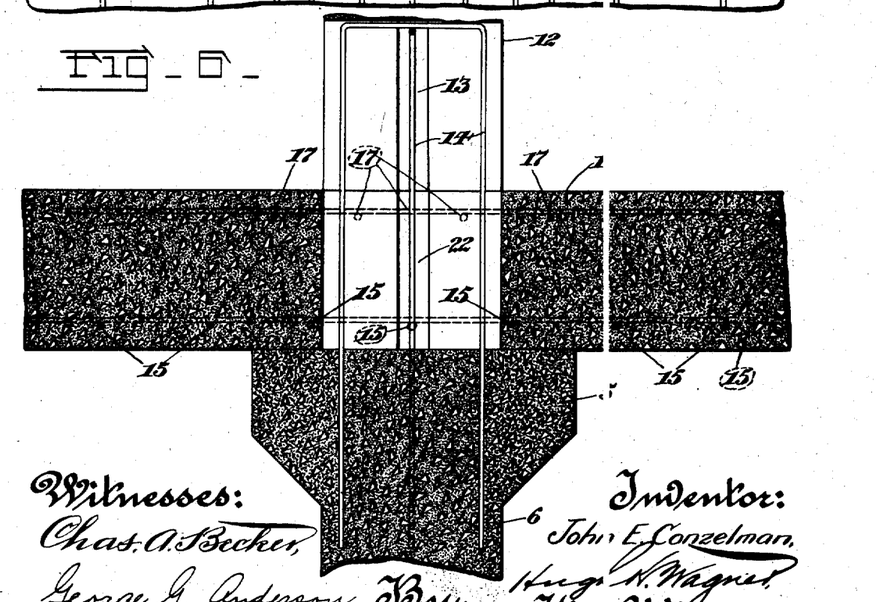
Fig. 6 is a sectional view on the line 6—6, Fig. 5.

In Figs. 5 and 6, the stud 7 is omitted and the slab 1 is supported at its center by column 6. Rods 15 are embedded in the lower part of said slab and rods 17, which are located preferably over column 6, are embedded in the upper part of said slab. A pair of slots 22, each of which preferably intersects the other, is formed in said slab and extends through the portion which rests on column 6. Rods 14 are set in column 6 in the manner hereinabove described, and, when said slab is placed upon said column each rod 14 will enter a slot 22. The stud 10 of column 12 is omitted and the base of said column rests upon slab 1. Each slot 13 occupies such position in column 12 that, when said column 12 is placed over column 6 and upon slab 1, each rod 14 will enter a slot 13 and each slot 13 will register with a slot 22. Said slots 13 are boarded up as hereinbefore described and grout or wet concrete which is poured therein fills each slot 22 and each slot 13, thereby forming an integral structure and a strong juncture.

Figure 7:
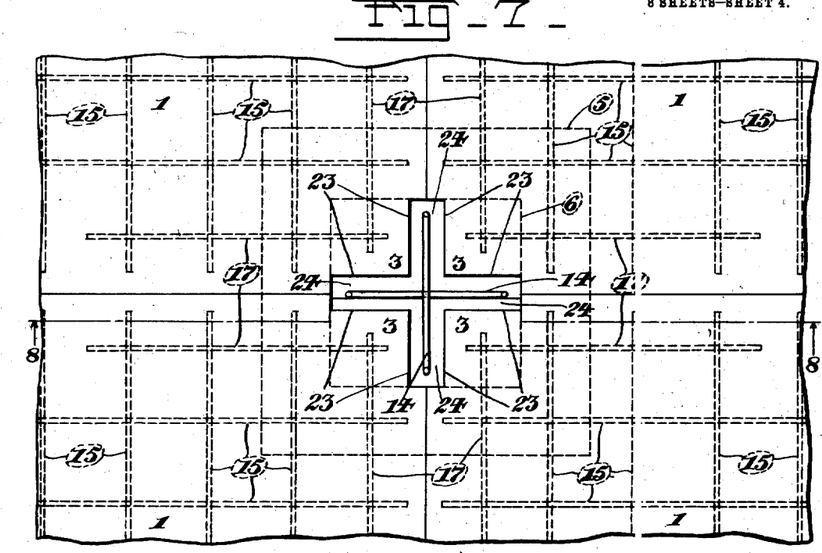
Fig. 7 is a plan view.
Figure 8:
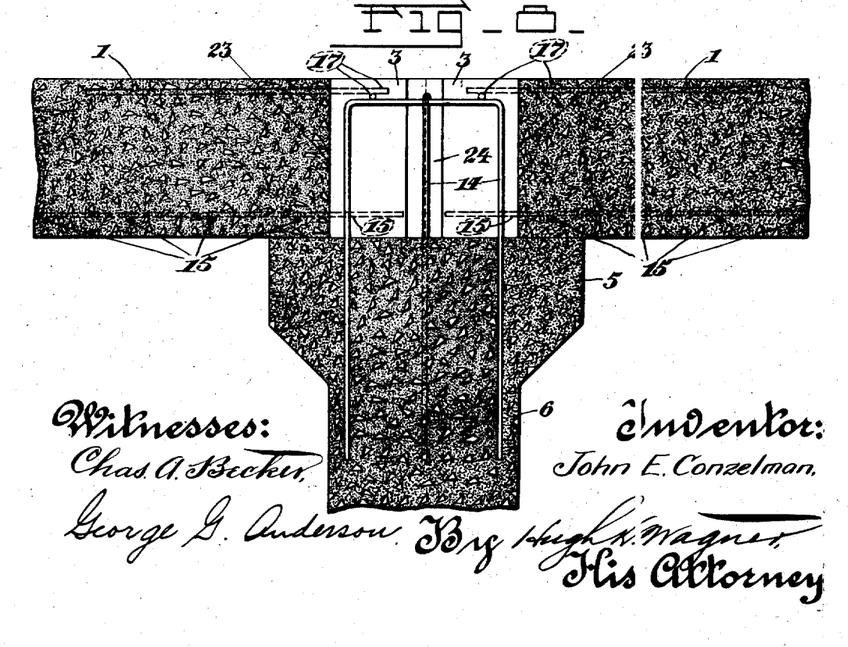
Fig. 8 is a sectional view on the line 8—8, Fig. 7.

In Figs. 7, 8, 9, and 10, the column 12 is omitted and a corner 3 of each slab 1 rests on column 6. In Figs. 7 and 8 each side of each corner 3 is provided with an indentation 23. When said slabs are placed in position on said column 6 each indentation 23 registers with an adjacent indentation and forms therewith a slot 24. Each slot 24 is preferably located opposite a similar slot 24. Rods 14 are set in column 6 so that each of said rods will enter a pair of oppositely-disposed slots 24. Said rods 14 extend preferably to a short distance below the level of the top surface of each slab 1. Each slab is provided with a reinforcing rod 15 in the lower part thereof and with reinforcing rods 17 in the upper part thereof. Said slots 24 are filled with grout or wet concrete which is allowed to set therein, thereby uniting the slabs and the column to form a rigid and unitary structure.

Figure 9:
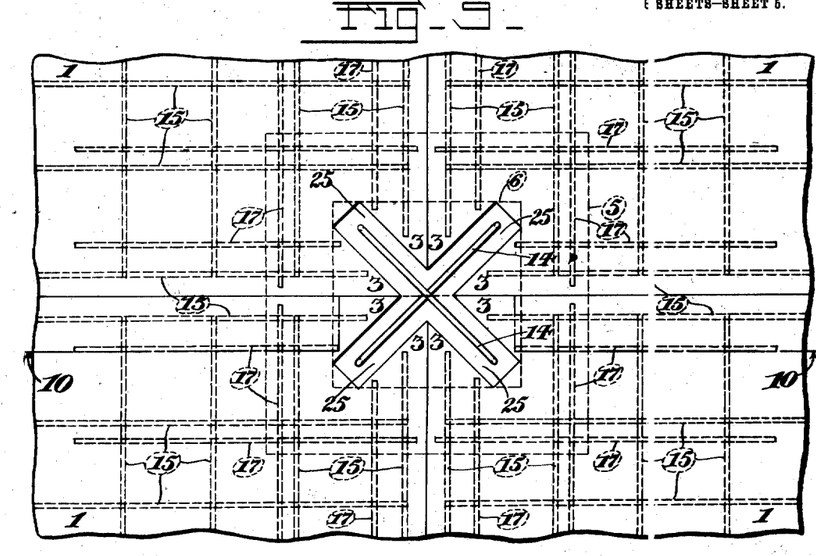
Fig. 9 is a plan view.
Figure 10:
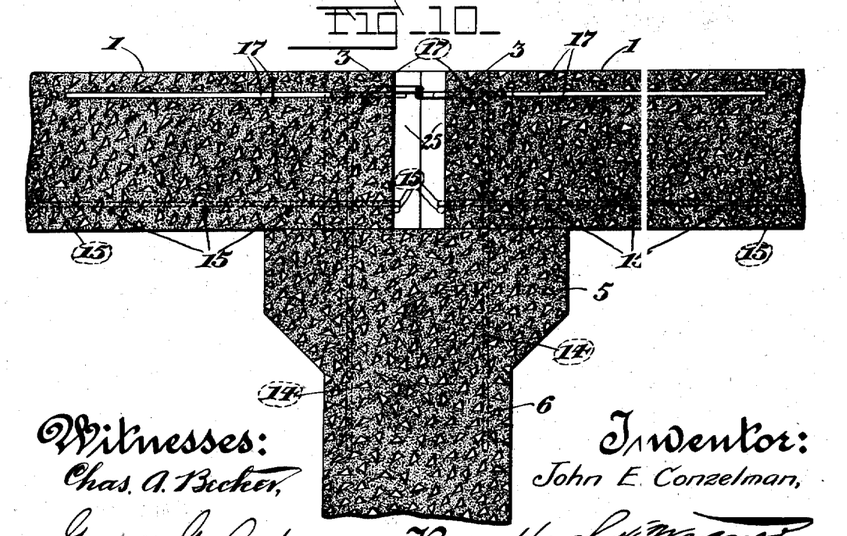
Fig. 10 is a sectional view on the line 10—10, Fig. 9.

In Figs. 9 and 10, each corner 3 is provided with a slot which extends preferably diagonally into said corner. When said corners 3 are placed on column 6, each slot 25 will occupy a position opposite another slot 25, and each rod 14 will enter a pair of oppositely-disposed slots 25. The slabs 1 and column 6 are united to form an integral structure by filling said slots 25 with grout or wet concrete and allowing the same to set therein.

Figure 11:
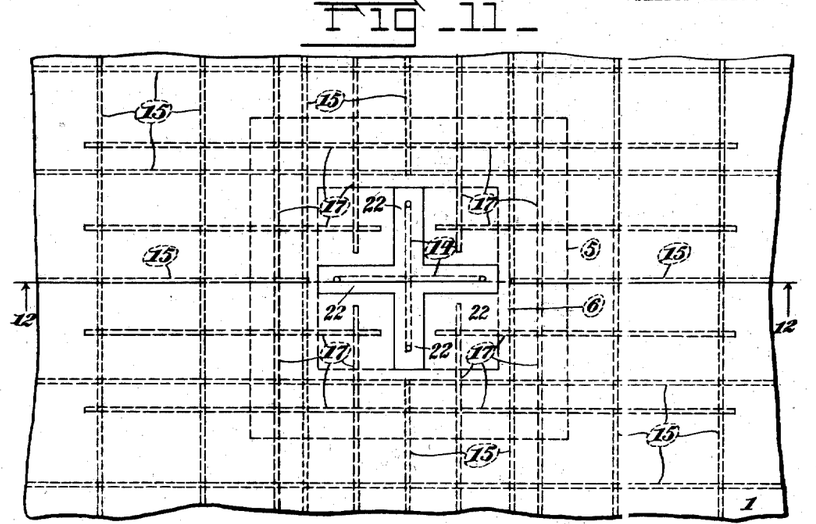
Fig. 11 is a plan view.
Figure 12:
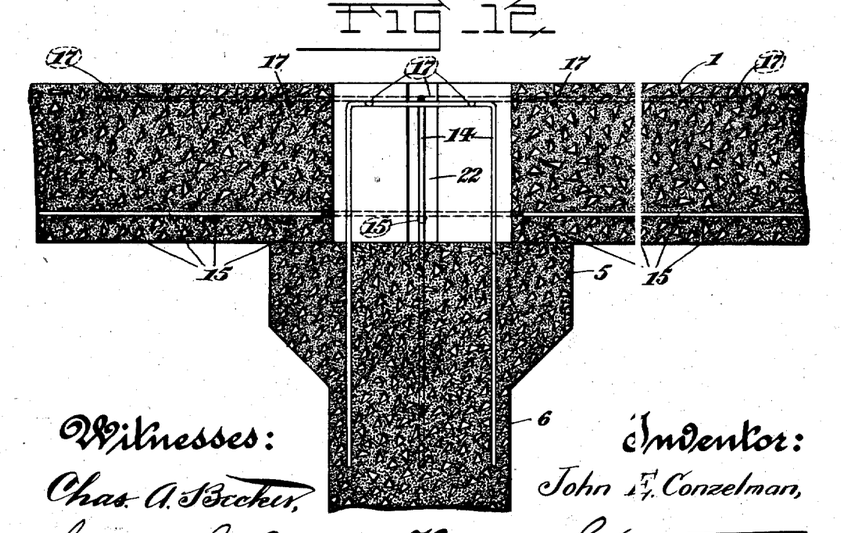
Fig. 12 is a sectional view on the line 12—12, Fig. 11.

In Figs. 11 and 12, the column 12 is omitted and the slab 1 is supported at or near its center by a column 6. The slots 22 are formed in said slab in the same manner as hereinabove described in the description of Figs. 5 and 6. Said slab is placed upon column 6 so that each rod 14 will enter a slot 22 and said slots 22 are filled with grout or wet concrete which is leveled off with the top surface of said slab and allowed to set. Said slab is thus united with said column 6 into a rigid and integral structure.

Figure 13:
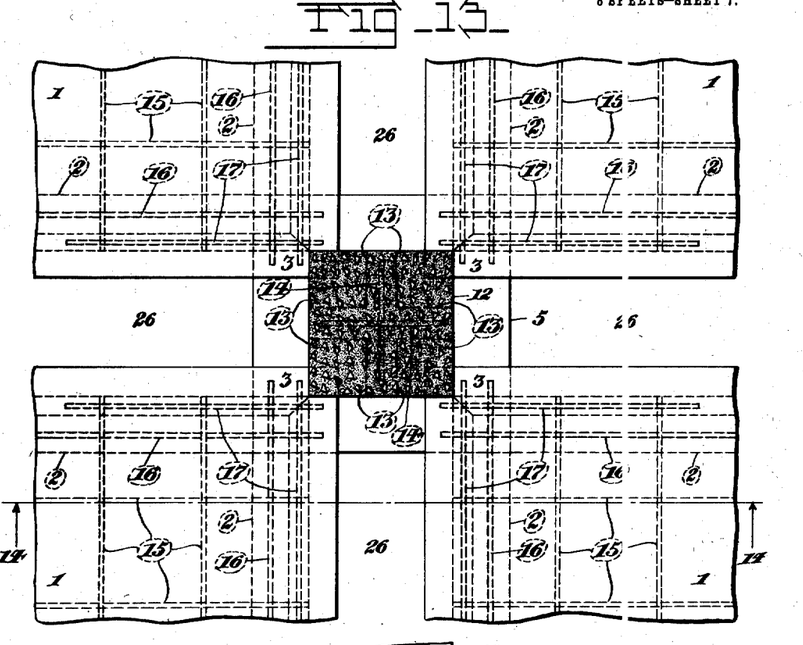
Fig. 13 is a plan view.
Figure 14:
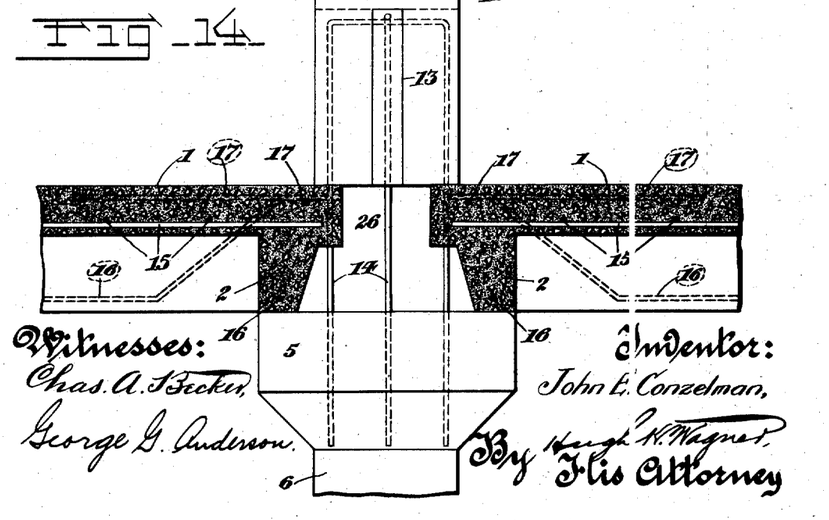
Fig. 14 is a sectional view on the line 14—14, Fig. 13.

In Figs. 13 and 14, each slab 1 is supported at a corner 3 by column 6. When said slabs 1 are all similarly placed upon column 6, a space 26 is left between each two adjacent slabs supported by said column. The column 12 is placed so as to rest upon each corner 3 and, also, in such position that each rod 14 projecting above column 6 will enter a slot 13 in said column 12. A so-called form (not shown in the drawings) is placed underneath each opening 26 between the adjoining edges of said slabs 1, and grout or wet concrete is poured upon said form and into said space 26. The grout or concrete in each space is leveled off flush with the top surface of each slab 1. The space under column 12 fills with grout or wet concrete which enters the same from spaces 26. Said grout or concrete is allowed to set and forms a beam (not shown in the drawings) in each space 26, and by reason of the concrete filling the space under column 12, the beam is formed continuous over column 6 and may be all-concrete or reinforcing rods may be set in said beam, and said elements are united into a strong and integral structure.

Figure 15:
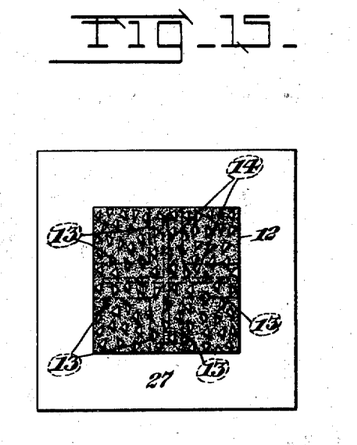
Fig. 15 is a plan view.
Figure 16:
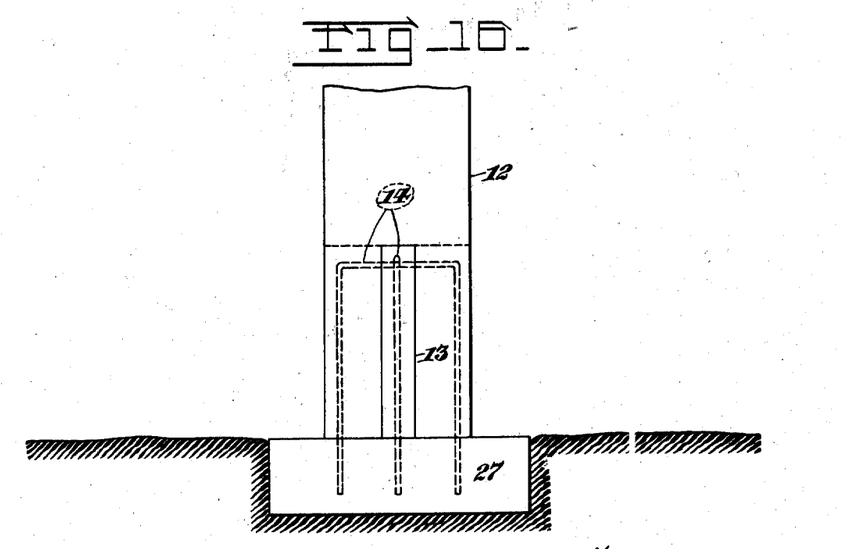
Fig. 16 is an elevation of Fig. 15.

In Figs. 15 and 16 a foundation 27, which is preferably concrete, is shown. Rods 14 are set in said foundation and each projects above the same into a slot 13 of a column 12, when said column is placed in position on said foundation. Slots 13 are covered with boards as hereinabove described and are filled with grout or wet concrete which sets therein and secures said column rigidly to said foundation.

It is to be understood that the monolithic, unitary concrete structure herein described is suitable for use not only in buildings and not only in the floors, ceilings, walls, and other parts thereof, but, also, in the construction of bridges and all other construction in which it may be desired to use the same.

I claim:

1. A concrete structure comprising a column surmounted by a stud, there being a rest on the top of said column around said stud, a plurality of slabs, each of said slabs having a corner abutting said stub and supported by the rest surrounding said stud, a column resting on said corners, said last-mentioned column being provided with a pair of slots, and a pair of rods having their ends set in said first-mentioned column, a portion of each of said rods extending into one of said slots, a concrete filler for said slots, and said columns and said slabs constituting a unitary structure when the concrete filler in said slots has become set.

2. A concrete structure comprising a column surmounted by a stud, there being a rest on the top of said column around said stud, a plurality of slabs, each of said slabs having a corner abutting said stud and supported by the rest surrounding said stud, each of said corners being provided with a recess, said recesses uniting to form a space into which said stud protrudes, a column supported by said corners, said last-mentioned column being provided with a pair of slots, and a pair of rods having their ends set in said first-mentioned column, a portion of each of said rods protruding into one of said slots, a concrete filler for said slots, and said columns and said slabs constituting a unitary structure when the concrete filler in said slots has become set.

3. A concrete structure comprising a column surmounted by a stud, there being a rest on the top of said column around said stud, a plurality of slabs, each of said slabs having a corner abutting said stud and supported by the rest surrounding said stud, each of said corners being provided with a recess, said recesses uniting to form a space into which said stud protrudes, a column having a shoulder resting upon said corners, a stud projecting from said last-mentioned column into said space, said last-mentioned column being provided with a pair of slots, and a pair of rods having their ends set in said first-mentioned column, a portion of each of said rods protruding into one of said slots, a concrete filler for said slots, and said columns and said slabs constituting a unitary structure when the concrete filler in said slots has become set.

4. A concrete structure comprising a column surmounted by a stud, there being a rest on the top of said column around said stud, a plurality of slabs, each of said slabs having a corner abutting said stud and supported by the rest surrounding said stud, each of said corners being provided with a recess, said recesses uniting to form a space into which said stud protrudes, a column having a shoulder resting upon said corners, a stud projecting from said last-mentioned column into said space, said last-mentioned column being provided with a pair of slots, a pair of rods having their ends set in said first-mentioned column, a portion of each of said rods protruding into one of said slots, each of said corners having a pair of indentations, said indentations uniting to form a plurality of oppositely-disposed slots, and a pair of rods having their ends set in said first-mentioned column, a portion of each of said last-mentioned rods extending into a pair of said oppositely-disposed slots, a concrete filler for all of said slots, and said columns and said slabs constituting a unitary structure when the concrete filler in said slots has become set.

5. A concrete structure including a supporting element, an element supported thereby, one of said elements having a pair of slots therein, which slots are arranged to intersect each other and extend through the sides of said element, and a pair of U-shaped rods having their free ends embedded in the other element and having their connecting portions crossing one another, said rods extending in said slots and having their connecting portions disposed in said slots adjacent the inner ends of the latter.

6. A concrete structure including a column having a stud projecting upwardly therefrom, and a rest surrounding the stud, a plurality of slabs supported by the rest and abutting the stud, and a column supported by the slabs, said second column having its lower end formed with a depending stud forming shoulders, the shoulders seating on the slab tops and the depending stud engaging the adjacent end portions of the slabs to prevent side motion of the second column.

7. A concrete structure including a column surmounted by a stud and a rest surrounding the stud, a plurality of slabs supported by the rest, said slabs having each a corner abutting the stud with a recess formed in said abutting corners, the recesses uniting to form a space into which the stud projects, and a column supported by said corners, the top faces of the slabs extending above the upper end of the stud, to form a space in connection with the recessed corners of the slabs and the top of the stud, and a concrete filler in said space.

8. A concrete structure including a column and an element supported therefrom, said element having a transverse slot therein which extends through the bottom and the adjacent side portions thereof, an inverted U-shaped member having its free ends embedded in the column and having its connecting portion spaced from the column top, said slot of said element being of greater width than that of said member to permit of shiftable adjustment of the element with respect to said member, and a concrete filler for said slot completely filling the same and surrounding said connecting portion of and said member and the portions of the legs of said member between the column top and the connecting portion of the member.

9. In combination with a column, a pair of U-shaped rods having their free ends embedded in said column and having their connecting portions crossing one another at substantially right angles at points above the column top and a series of slabs seating on top of the column, each of the slabs having a cutaway portion at points overlying the column, said cutaway parts uniting to form a space into which said pair of rods project.

10. In concrete construction, a connection between a support and means supported thereby consisting of a pair of U-shaped rods having their free ends embedded in one of the said parts and having their connecting portions crossing one another at approximately right angles and projecting beyond the part which carries them, the other part having a slotted portion formed to receive the rods and their connecting portions, said slotted portion extending through the adjacent end of the part formed therewith, and a concrete filler for said slot surrounding the portions of the rods above the part which carries the rods and also surrounding said connecting portions of the rods.

11. A concrete structure including a column surmounted by a stud and a rest surrounding the stud, a U-shaped rod having its end portions extending down through the stud and into the column and having its connecting portion extending above the stud in spaced relation thereto, a plurality of slabs supported by the rest and surrounding the stud, and a slotted column seating on the slabs, and having the upper outer end of said rod extending into said slot.

In testimony whereof I have affixed my signature in presence of two witnesses.

JOHN E. CONZELMAN.

Witnesses:
GLADYS WALTON,
GEORGE G. ANDERSON.